(12) United States Patent
Dally et al.

(10) Patent No.: US 6,218,605 B1
(45) Date of Patent: Apr. 17, 2001

(54) PERFORMANCE OPTIMIZING SYSTEM FOR A SATELLITE SOLAR ARRAY

(76) Inventors: Robert B. Dally, 638 Orchard Ave., Santa Barbara, CA (US) 93108; P. Alan Jones, 321 Barranca Ave., Santa Barbara, CA (US) 93109

( * ) Notice: Subject to any disclaimer, the term of this patent is extended or adjusted under 35 U.S.C. 154(b) by 0 days.

(21) Appl. No.: 08/841,526

(22) Filed: Apr. 23, 1997

(51) Int. Cl.[7] .................... H01L 31/0232; H01L 31/045; B64G 1/44
(52) U.S. Cl. .................. 136/244; 136/291; 136/292; 136/245; 244/173; 323/906
(58) Field of Search .................. 136/292, 291, 136/245, 244, 251, 293; 244/173; 323/906

(56) References Cited

U.S. PATENT DOCUMENTS

| | | | | |
|---|---|---|---|---|
| 4,513,167 | * | 4/1985 | Brandstetter | 136/244 |
| 5,131,955 | * | 7/1992 | Stern et al. | 136/245 |
| 5,158,250 | * | 10/1992 | Reboux | 244/166 |
| 5,500,052 | * | 3/1996 | Horiuchi et al. | 136/244 |
| 5,620,529 | * | 4/1997 | Bassily et al. | 136/245 |
| 5,637,155 | * | 6/1997 | Inoue | 136/244 |
| 5,669,987 | * | 9/1997 | Takehara et al. | 136/244 |
| 5,720,452 | * | 2/1998 | Mutschler, Jr. | 244/173 |
| 5,779,817 | * | 7/1998 | Wecker | 136/293 |
| 5,874,786 | * | 2/1999 | McVey et al. | 307/18 |

OTHER PUBLICATIONS

"Solar Cell Array Design Handbook" H.S. Rauschenbach, p. 297, 1980.*

* cited by examiner

Primary Examiner—Ellis Robinson
Assistant Examiner—Michael C Miggins
(74) Attorney, Agent, or Firm—Lyon & Lyon LLP

(57) ABSTRACT

A satellite solar array performance optimizing system that isolates a subsection of a solar array to provide power during transfer orbit operation, then connects the subsection in series with an adjacent section to maintain maximum power output at the satellite operating bus voltage. The isolated subsection is provided on an outer panel populated with solar cells in series calculated according to the parameters of the satellite mission to provide maximum power output matching the operating bus voltage. The outer panel subsection of solar cells is connected directly to the operation bus by a passive diode or a mechanical switch such as a latching relay. An adjacent or intermediate panel has a section of solar cells that are connected in series with the subsection of the outer panel and connected through a blocking diode to the operating bus. The intermediate panel is populated with solar cells calculated to complement the solar cells subsection on the outer panel so that they maintain the power requirements of the operating bus when the satellite reaches its final orbit and the solar panels are deployed. The outer panel, intermediate panel and inner panel are populated with solar cells calculated to maintain the power throughout the life of the satellite.

15 Claims, 3 Drawing Sheets

PERFORMANCE OPTIMIZING SYSTEM FOR A SATELLITE SOLAR ARRAY

FIELD OF THE INVENTION

This invention relates to optimizing power output of satellite solar arrays and more particularly relates to a method and apparatus to optimize solar array performance with passive diode switching of different states of a satellite mission.

BACKGROUND OF THE INVENTION

Satellites are usually launched with their solar arrays stowed against the spacecraft sidewalls to fit within the launch vehicle. In this configuration, most of the power from the solar array is not available because there is no exposure to the sun. However, usually an outboard portion of the solar array is stored so that it's outward facing end produces some power from whatever sunlight reaches it during the initial phase, also known as "transfer orbit" (i.e., transfer from the as-launched orbit to the preferred mission orbit).

Solar arrays on satellites generally have three phases of operation. The first phase is the stowed configuration, in which the solar panels of the array are folded, concealed and compacted into a small area that accommodates fitting the satellite into the launch vehicle's cargo space. For maneuvering purposes, the solar panels are maintained in a stowed position until the satellite is properly placed in its final orbit. The time between launch of the satellite and it reaching its final orbit is generally referred to as "transfer orbit." The second phase of operation is deployment of the solar panels once the satellite is comfortably situated in it's destination orbit. The last and third phase constitutes the deployed panels at the end of the satellite's useful life.

Typically, the size of solar arrays are designed for their end-of-life (EOL) voltage and power requirements to meet the minimum voltage and power requirements of the satellite's electrical operation bus. That is, the maximum EOL power output of the solar array should meet the minimum power requirements of the satellite's electrical operation bus. The present method of meeting this EOL requirement necessarily means some degree of over-design at the BOL (beginning-of-life). Therefore, to provide sufficient EOL voltage the design will produce as much as twenty-five percent (25%) excessive voltage output at the BOL. Since standard satellite power regulation electronics operate at a constant voltage, the excessive voltage differential is wasted during BOL operation.

Solar cells are also temperature dependent devices and their running temperature depends on satellite orbit location and solar array geometry. At EOL, a deployed solar array operates at about 50° C. which goes into the design analysis to meet the satellite minimum voltage requirement. Thus, during transfer orbit with the solar array not yet deployed and held tightly against the spinning satellite, as described above (typical stowed configuration) the solar array operates at about −20° C. This 70° C. temperature difference (−20° C. to +50° C.) further exacerbates the voltage differential noted above. The BOL voltage can be as much as sixty percent (60%) above the constant operating voltage required. This effectively amplifies the mismatch between the satellite constant voltage required and the voltage supplied leaving as much as a third or more of the voltage that cannot be traversed.

Therefore, one object of the present invention is to optimize solar array performance throughout the life of a satellite mission.

Another object of the present invention is to optimize solar array performance so as to provide maximum power output that matches the satellite's operation bus voltage during transfer orbit operation.

An object is also to optimize solar array power performance by selectively isolating non-contributing sections of a solar array to maintain the maximum power output of the stowed, BOL solar array.

A solar array power output is optimized as another object of the present invention by isolating a subsection of the solar array during transfer orbit operation and then connecting the subsection in series with another section to provide maximum power output that matches the power of the satellite operating bus at deployed EOL.

The solar array power output is optimized by connecting a subsection of the solar array through a switching device that automatically connects the subsection to the full array upon deployment of the solar panel of a satellite. Preferably, the switching devices are passive elements such as bypass diodes connecting sections of a solar array to the satellite's operating bus.

BRIEF DESCRIPTION OF THE INVENTION

The purpose of the present invention is to provide a method and apparatus to optimize the performance and power output of solar arrays on panels through all phases of the satellite mission from launch transfer orbit and final destination orbit of a satellite.

The solar arrays, on the solar panels of a satellite, produce power commensurate with the three phases of operation described hereinabove as transfer orbit operation, deployed operation at BOL and deployed operation at EOL. The power produced during transfer orbit is severely restricted due to the limited area exposed to the sun. Only the outermost panels will be exposed to the sun, while the other panels that are stowed are hidden from the sun (shaded by the outermost panels). Furthermore, the exposed solar panel is generally not normal to the sun and experiences a cosine angle related loss of power. Further, the satellite is often spinning during transfer orbit, which further reduces the power output from the solar array (called a one-over Pi loss). The satellite is usually maneuvering itself into its destination orbit during this transfer period, which generally precludes the outermost solar panel from tracking the sun.

During the second phase, the satellite is now in its final destination orbit, and the solar panels are fully deployed and tracking the sun so they produce maximum solar array power. In nearly all cases, the power produced in this phase is excessive and only a portion of the array's power is gathered. The deployment stage is often referred to as "beginning of-life" (BOL) stage.

The third phase, or "end-of-life" (EOL) stage is the stage at which the solar arrays have been degraded in power as the result of their useful operation in the space environment due to radiation. Generally, the solar arrays are sized such that the EOL power is just enough to power the satellite's load requirements. This power is generally equivalent to the partially utilized power in the BOL stage.

Critical factors in the analysis of power are the operating voltage of the satellite and the maximum power voltage of the solar arrays. Generally, the solar arrays are designed to have an EOL maximum power voltage that matches the satellite's operating bus voltage. The EOL maximum power voltage of the solar array is a function of the solar cells' maximum power voltage, the degradation factors associated with the satellite orbit and the EOL phase, the operating temperature of the solar cells at EOL and thus, the number of solar cells in series. A problem that is often encountered is that the solar arrays' BOL maximum power voltage is much higher than the satellite's bus voltage due to the non-degradation state of the solar. Cells and due to the more efficient cold operating temperature of the solar arrays (caused by spinning and off angle cosine).

A solution to this problem is to isolate sections of the solar array and then bring them on-line or switch them into the circuit when they are needed to maintain the maximum power output matching the operating bus voltage of the satellite. Thus, by using switching devices, a subsection of a solar array can be kept in the circuit to provide maximum power voltage that matches the satellite's operating bus voltage through all phases of operation. This solution involves populating the solar panels of a solar array with the number of solar cells needed to maintain the maximum power output at the operating voltage of the satellite's operating bus, and connecting them in the circuit as needed.

To start, the outermost panel is fully populated with circuits having the appropriate number of solar cells in series such that their maximum power voltage during first phase or transfer orbit operation is matched to the satellite's operating bus voltage. This first subsection is connected to the operating bus through a switching device such as a passive diode. This design extracts maximum power that the outermost solar panel can produce while isolating (i.e., "switching" out non-productive sections of the solar array).

The solar cell population of the outermost panel is calculated from the design parameters of the satellite's mission. That is, the particular orbit that it will be in and its relation to factors in space that can cause degradation such as the Van Allen radiation belt. Once the satellite operating bus voltage and the mission parameters are determined, the number of cells needed to populate the outermost panel can be calculated. This allows the size of the solar cells in the array to be maximized, thereby minimizing solar array costs. The number and size of cells populating the outermost panel will thus provide maximum power output matching the operating bus voltage throughout the first phase or transfer orbit operation.

Continuation or complementary circuits are provided by an adjacent or intermediate panel, or the next inward panel (via standard flex cables which already exist) populated with a sufficient number of solar cells in series as a continuation circuit to meet the EOL maximum power voltage required for the life of the satellite. Generally, the next inward or intermediate panel is in the dark throughout the transfer orbit operation and is therefore, non-productive and isolated or "switched out" of the circuit. Preferably, the switching device is a bypass diode connecting the outer panel solar cell subsection directly to the operating bus. The intermediate panel is populated with a series of solar cells that are also connected in series with the outer subsection of cells so that when the solar panel is deployed, the outer panel subsection of solar cells in series and combined with the intermediate panel section of solar cells provide the maximum power output that matches the operating bus voltage.

A first bypass diode in parallel with the continuation or complementary circuit of the intermediate panel prevents the intermediate (i.e., middle) panel from limiting the current flow from the outer panel while they are in the dark during the transfer orbit operation phase.

Subsequent inner panels are populated with sufficient solar cells in series to maintain the maximum power output of all the entire solar array to match the satellite operating bus voltage. The bypass diodes, which are relatively inexpensive, do not adversely affect reliability and contribute an insignificant weight increase. Weight is a critical problem in the construction of satellites with each pound adding substantial costs to the effort to place the satellite in orbit. An additional advantage of bypass diodes is that they are passive in operation and utilize existing real estate (on the back side of the solar panels). The design of the system, disclosed and described herein, is flexible with the maximum power voltages of the EOL and transfer orbit phases.

The above and other novel features of the invention will be more fully understood from the following detailed description and the accompanying drawings, in which:

DETAILED DESCRIPTION OF THE INVENTION

Figure 1:
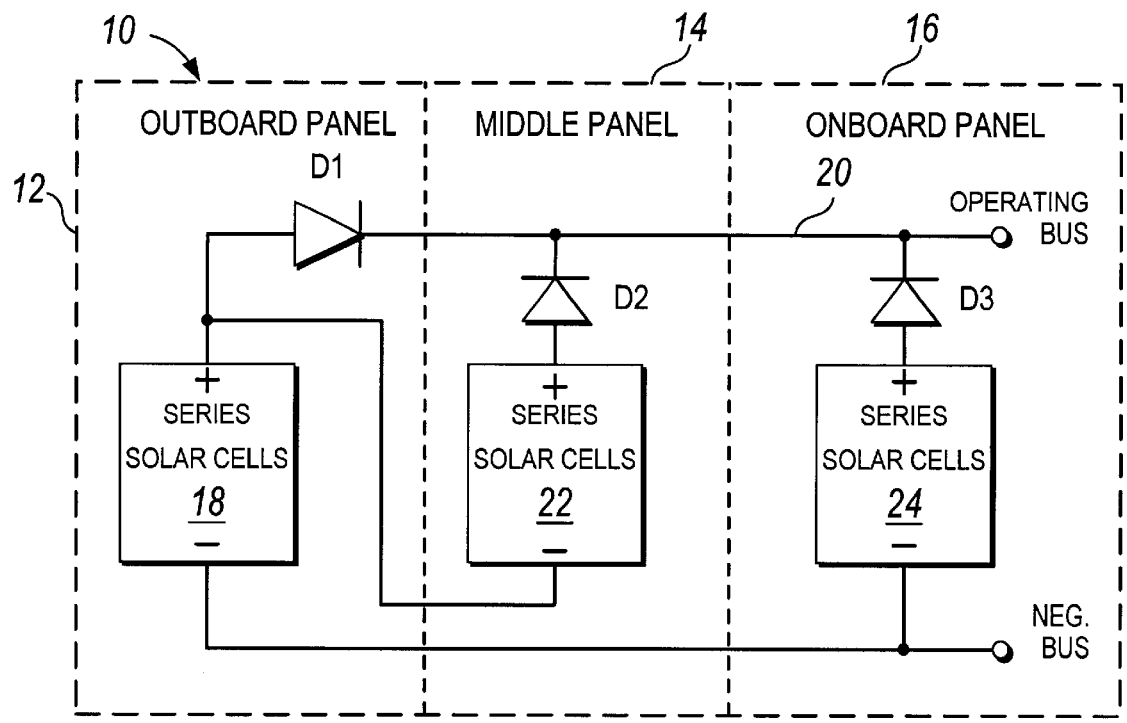
FIG. 1 is a schematic block diagram illustrating the solar array performance optimizing system of the invention.

Referring to the block diagram of FIG. 1, a typical solar array 10 is illustrated and is comprised of an outboard panel 12, an intermediate or middle panel 14 and an inboard panel 16. During the first phase of operation, solar panels 12, 14 and 16 are in a stowed configuration with the solar panels folded, concealed or compacted into a small area that accommodates fitting the satellite into the launch vehicle's cargo space. During the first phase, or transfer orbit operation, intermediate panel 14 and in board panel 16 are in the dark and provide no power output to the satellite's operating bus. Generally, if the solar arrays on each of the panels 12, 14 and 16 were all connected in series, no output could be provided to the satellite operating bus until these panels were fully deployed. The reason for this is that the intermediate panel 14 and input panel 16 would be dark and any power output from the outboard panel 12 would be prevented by the inoperative cells in series.

A solution to providing power during transfer orbit operation and optimizing the performance of the solar array is to populate outboard panel 12 with sufficient solar cells calculated to provide maximum power to the operating bus. Solar cell subsection 18 is populated by calculating the number of cells needed based on the mission of the satellite and the voltage required on the operating bus 20. This voltage can be 28V, 32V, 34V, 40V or some other voltage. For purposes of illustration, an operating voltage of approximately 31 volts on operating bus is assumed. To provide 31 volts power output to operating bus 20, solar cell array 18 is populated with sufficient cells to maintain a maximum power output of 31 volts throughout transfer orbit operation. These cells are then connected to the operating bus through bypass diode D1. This allows the power output from series solar cell subsection 18 to match the operating voltage of satellite operating bus 20. Bypass diode D1 bypasses solar cell section 22 in intermediate panel 14.

Solar cells in the array are temperature dependent devices, and their running temperature depends on orbit location and solar array geometry. The deployed solar array 10, at the end-of-life phase (EOL) runs at about 50° C. This temperature is used in the design analysis to meet the operating bus 20 voltage requirement at EOL. However, solar array 10 is stowed against a spinning spacecraft in transfer orbit (typical configuration) where it will operate at about −20° C. This is approximately a 70° C. temperature difference (−20° C. to +50° C.) which further exacerbates the voltage differential during the different phases of operation. The deployed BOL voltage goes substantially up above the operating bus voltage amplifying the mismatch between the voltage supply and voltage used, leaving a large voltage differential that cannot typically be harnessed.

Solar arrays, such as solar array 10, are typically made up of multiple solar cell string circuits in series that are about 100 cells long (i.e., the voltage of 100 cells adds up to produce the total voltage, e.g., 40 volts at EOL, this is much larger at the BOL). To eliminate the large voltage waste and access the fully stowed voltage capability, one must isolate subsection 18 of the solar array 10. For example, if solar array 10 of 100 cells could produce an output voltage of 64 volts at BOL and the operating bus voltage needed was only 40 volts, subsection 18 would be isolated (i.e., switched out) of solar array 10 to provide the maximum power output to match the voltage of operating bus 20. If solar array 10 could produce as much as 64 volts, and only 40 volts were needed, then the number of cells in subsection 18, needed to produce 40 volts, would be 40/64×100 which would equal approximately 63 cells. To provide this isolation, subsection 18 is populated with the appropriate number of cells to provide a maximum power output matching the operating bus voltage is connected through bypass diode D1 in this case 40 volts. Diode D1 also serves as a blocking diode for the other series of solar cells 22 and 24 and serves as a bypass diode for the series solar cell subsection 18. An outer panel subsection 18 having a ratio in the range of 2/3 to 3/4 of the combined cells (60% to 75%) on the outer and intermediate panels indicated by calculations.

Figure 2:
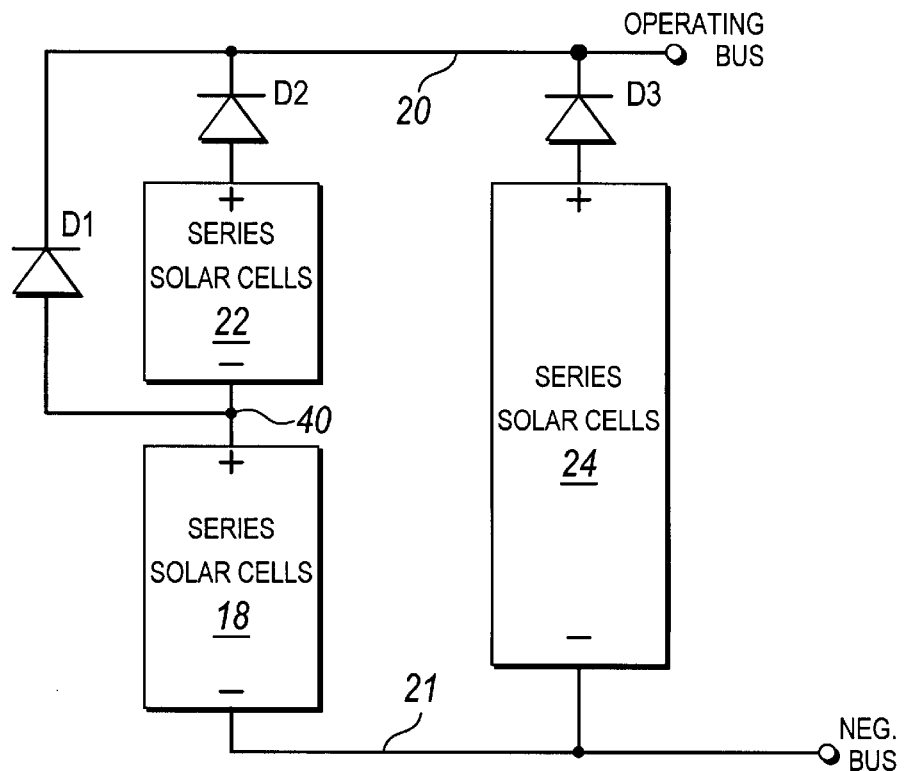
FIG. 2 is a simplified diagram of the system illustrated in FIG. 1.

The operation of the system illustrated in FIG. 1 is shown by the simplified schematic diagram of FIG. 2. During transfer orbit, intermediate panel 14, having solar cells 22 and in board panel 16, having solar cells array 24, are in the dark. Solar cell subsection 18, on the outer panel, will be exposed to some sunlight to provide power to operating bus 20. Solar cell subsection 18 on the outer panel, permit sustaining the necessary output power to match the operating bus voltage because of their cold operating temperature at BOL. Thus, solar subsection 18 can supply current to operating bus via bypass diode D1 during transfer orbit operation. Solar subsection 18 can provide the voltage drop between the operating bus 20 and negative bus 21 that matches the operating voltage on the satellite and provide current to operate the satellite circuits. At this time, solar cells subsection 22 and solar subsection 24 are in the dark and provide no power output.

If the outer panel warms (e.g., at deployment) and middle panel 14 is in the dark, the voltage is less than operating bus voltage and no current would be supplied to operate the satellite circuits. To maintain the performance of the solar array and provide an output matching the operating bus voltage at deployment, the series solar cells 22 on the middle panel are populated with sufficient cells calculated to complement the voltage of outer panel subsection 18. When solar array 10 is deployed and the outward panel warms, series solar cells 22 are automatically connected in series with subsection 18. During this period of operation, diode D1 becomes a reverse biased bypass diode allowing the continuation of complementary circuit of solar cells 22 to maintain the maximum power output of solar array 10 at the operating bus voltage. When sunlight illuminates outer panel 12 and intermediate panel 14 at deployment, solar cell subsection 18 is connected in series with continuation circuit of solar cells 22, which will provide sufficient voltage to generate current on operating bus 20.

Figure 3:
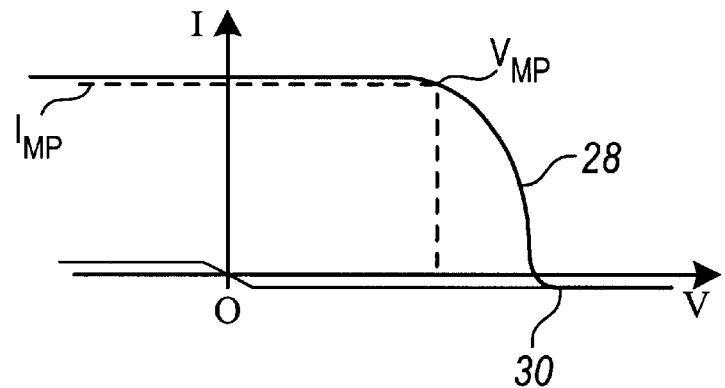
FIG. 3 is a graph illustrating the operation of a solar array subsection during the transfer orbit operation phase.
Figure 4:
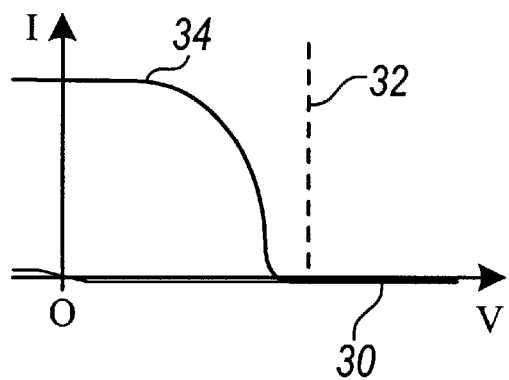
FIG. 4 is a graph illustrating the reduction in power of a solar array subsection as it warms.
Figure 5:
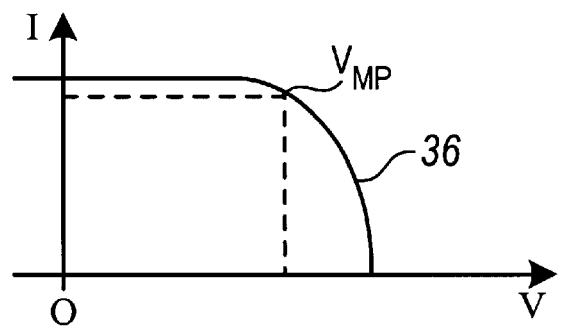
FIG. 5 is a graph illustrating the operation of the system of FIG. 1 when an outer subsection of the solar array is connected in series with an intermediate section as the solar arrays are deployed.

The different periods of operation are illustrated by the graphs in FIGS. 3 through 5. FIG. 3 illustrates the operation of the solar array during transfer orbit operation. The dotted lines intersect curve 28 at the $V_{mp}$ indicating maximum power output (about 1.8 amps) to operating bus from solar cell subsection 18 to match the operating bus voltage. At this time, the middle and inner panel power output indicated by curve 30, provide no output because they are in the dark.

If outer panel solar cell subsection 20 warms, the output will drop as illustrated in FIG. 4. Dotted line 32 indicates the voltage of the operating bus while curve 34 shows the degrading voltage of solar subsection 18 dropping below the maximum power. At this time, no current would be supplied to operating bus 32 because the voltage of subsection 18 would drop below the operating bus voltage indicated by dotted line 32.

However, with the system illustrated in FIGS. 1 and 2, the operation will be as shown by the graph of FIG. 5. When the solar array 10 is deployed allowing outboard panel 12, intermediate panel 14 and inboard panel 16 to be illuminated with sunlight, the continuing circuit of solar cell array 22 in series with subsection 18, connected to operating bus through diode D2, provides maximum power output to match the operating bus voltage. $V_{mp}$ indicates the voltage and maximum power output of the entire array. Curve 36 represents the combined output of solar cell subsection 18 and solar cell continuing circuit 22 on the outboard panel 12 and intermediate panel 14. Outer and intermediate panels, 12 and 14 in combination with the in board panel 16, connected in parallel through Diode D3 provide a maximum power output matching the operating bus voltage during the life of the satellite.

Figure 6:
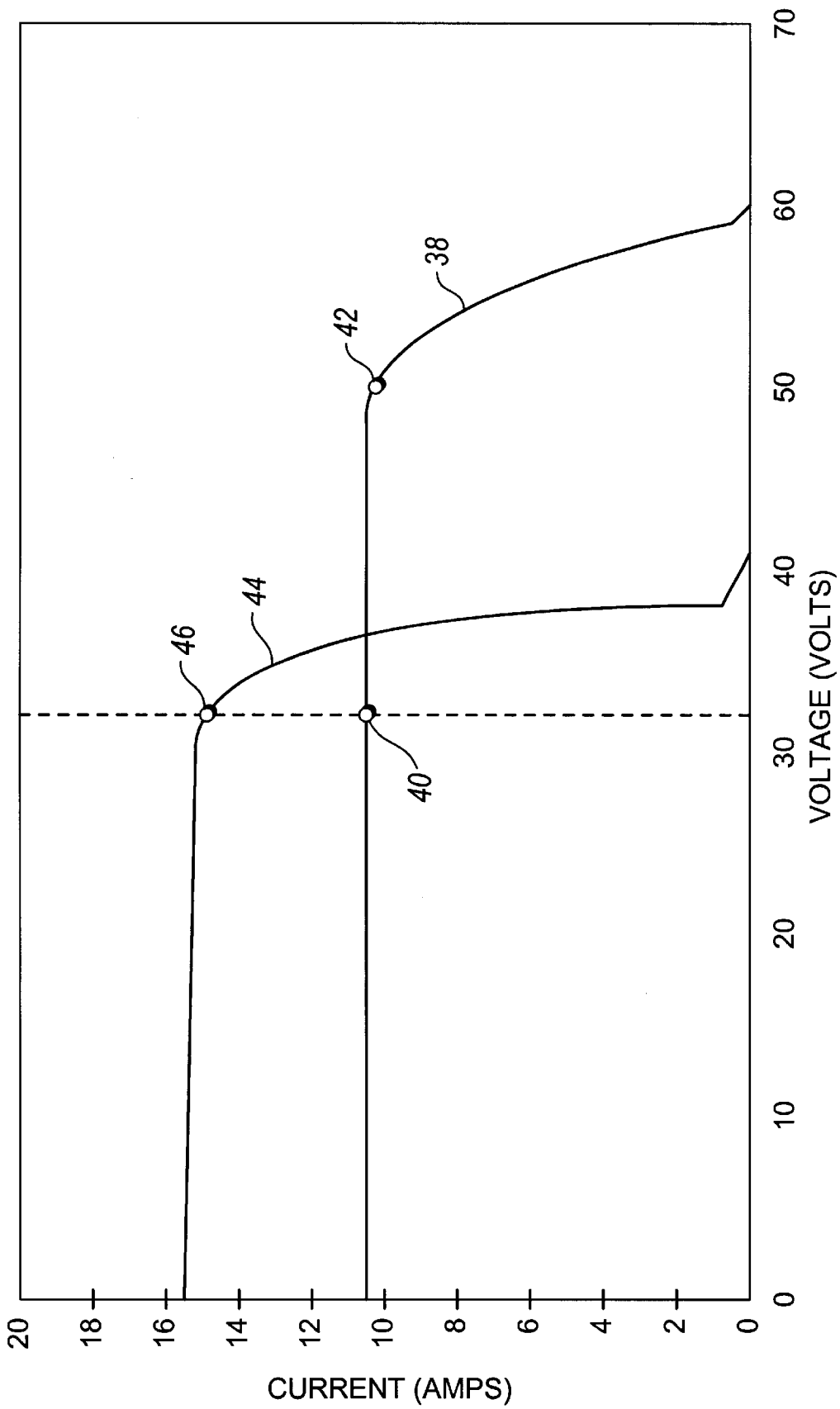
FIG. 6 is a graph illustrating the electrical operation of only the outboard portion of the solar array during transfer orbit.

A graph illustrating the electrical operation of only the output portion of 18 of the solar array during transfer is shown in FIG. 6. The lower curve indicated at 38 illustrates the effects of having the proper number of solar cells in series to meet the EOL voltage. The maximum power ($V_{mp}$) indicated at 42, exceeds the system bus voltage indicated at 40 by virtue of its cold operating temperature and BOL, non-degraded (i.e., non-EOL) performance. The operation of the system is inefficient at operating point 40 (i.e., operating point 42 is not at maximum power).

The operation of the solar system, with fewer cells in series on outboard panel 18, with continuing circuit on the middle shaded panel 22, is illustrated in the curve indicated at 44. The fewer cells in series on outboard panel 18 allows the circuit's maximum power voltage to be matched to the system bus voltage indicated by operating point 46, which is identical to operating point 40. The continuation circuit on middle panel 22, which is shaded during transfer orbit, is passively and temporarily bypassed with bypass diode $D_1$. The fewer cells in series on one or more outboard panels 18, illustrated by operating curve 44, allows more circuits to be placed in parallel on one outboard panel 12 thereby, maximizing current and hence, the maximum operating power ($V_{mp}$) point 46 at the system operating bus voltage.

Thus, maximum power ($V_{mp}$) matches the operating bus voltage and maximum power is utilized. In contrast, without the configuration of the invention, the maximum power output ($V_{mp}$) is at operating point 42, far exceeding the operating bus voltage indicated at operating point 40, and maximum power is not utilized.

The preferred circuit illustrated in FIGS. 1 and 2 involves the use of bypass diode D1 to selectively connect subsections of solar array 10 to the operating bus during the various phases of operation of the satellite. Another less desirable option would be to provide a mechanical switch such as a latching relay at junction 40 (FIG. 2) to connect solar cell subsection 18 directly to operating bus 20 during transfer orbit operation. At deployment, the switch would connect continuing solar cell circuit 22 in series with subsection 18 to operating bus 20. However, electrical switching devices are less preferred because they are costly and considered poor reliability risks. A switching circuit that uses latching relays or mechanically activated switches to reconfirm the solar sections could be used. Such a solution is less desirable because it would increase the number of circuits. Further, switches add additional weight and reduce the reliability of the power conditioning circuit. For that reason, passive circuits that can be easily added with minimum additional weight and more reliability are preferred.

Thus, there has been disclosed a method and apparatus for optimizing the performance of a satellite solar array. Performance is optimized by isolating subsections of the solar array and bringing them on-line as needed. In the preferred embodiment, a bypass diode is used to connect a subsection of a solar array to the operating bus to match the power requirements while "switching out" or isolating the rest of the array. As the solar array is deployed when reaching its final destination in orbit, the subsection is connected in series with a continuation circuit of solar cells in an intermediate panel to maintain the maximum power matching the operating bus voltage.

This invention is not to be limited by the embodiment shown in the drawings and described in the description which is given by way of example and not of limitation, but only in accordance with the scope of the appended claims.

What is claimed is:

1. A satellite solar array performance optimizing system comprising:
   an outer solar panel populated with a subsection of solar cells in series calculated to provide maximum power output that matches a voltage on an operating bus of a satellite during transfer orbit operation;
   an intermediate solar panel having a section of solar cells in series with said subsection of solar cells in series on said outer panel, said section of solar cells in series on said intermediate solar panel calculated to complement the output of said outer solar panel subsection of solar cells in series to provide maximum power output matching said operating bus voltage when said solar panels are deployed;
   switching means connecting said outer panel subsection of solar cells directly to said bus when said solar panels are stowed and automatically connecting said outer panel subsection of solar cells and said intermediate panel section of solar cells in series to said bus when said solar panels are deployed;
   an inner solar panel having a section of solar cells connected in series and calculated to provide maximum power output in conjunction with said outer solar panel subsection of solar cells in series and said intermediate solar panel section of solar cells in series when deployed that provides maximum power output matching said satellite operating bus voltage throughout an operating life of said satellite.

2. The system of claim 1 in which said switching means comprises a bypass diode connected in parallel with said intermediate panel section of solar cells.

3. The system according to claim 2 in which said intermediate solar panel section of solar cells in series and said inner solar panel are connected to said satellite operating bus through blocking diodes.

4. The system according to claim 3 in which said inner solar panel section of solar cells is connected in parallel with said outer panel subsection of solar cells in series and said intermediate solar panel section of solar cells in series.

5. The system according to claim 3 in which said outer panel subsection of solar cells in series is populated with solar cells that constitute a range of sixty percent to seventy-five percent (60% to 75%) of the number of solar cells in series constituting said outer panel subsection of solar cells in series and said intermediate solar panel section of solar cells in series.

6. The system of claim 1 in which said switching means comprises a mechanical switch.

7. A satellite solar array performance optimizing system comprising:
   a plurality of solar panels populated with solar cells calculated to maintain a power output to match an operating bus voltage of a satellite to its end of life, said plurality of solar panels having an outer panel and a second panel;
   said outer panel being populated with a subsection of solar cells calculated from mission parameters of the satellite to provide a maximum power output at the operating bus voltage of the satellite during transfer orbit operation;
   said second panel being populated with a subsection of solar cells calculated to complement the output of said outer panel subsection of solar cells when said plurality of panels are deployed to thereby provide a power output that matches the operating bus voltage of the satellite at its end of life;
   switching means connecting said outer panel subsection of solar cells directly to said satellite operating bus when said panels are stowed and automatically connecting said outer panel subsection of solar cells and said second panel subsection of solar cells in series to said bus when said solar panels are deployed.

8. A satellite comprising:
   an electrical operation bus having a minimum voltage requirement;
   a plurality of solar cells connected in series;
   an outer solar panel populated with a first subsection of said plurality, said first subsection comprising X solar cells connected in series;
   a second panel populated with a second subsection of said plurality, said second subsection comprising Y solar cells connected in series;
   switching means connecting said first subsection directly to said bus when said solar panels are stowed and automatically connecting said first and second subsections in series to said bus when said solar panels are deployed;
   wherein X is approximately the number of solar cells required during transfer orbit operation to provide generally said minimum voltage requirement, and X+Y is approximately the number of solar cells required during end-of-life operation to provide generally said minimum voltage requirement.

9. The system of claim 8 in which said switching means comprises a bypass diode connected in parallel with said second subsection of solar cells.

10. The system of claim 8 in which said switching means comprises a mechanical switch.

11. The system of claim 8 in which the value of (X/(X+Y)) is between 0.6 and 0.75.

12. The system of claim 8, further comprising a third subsection of solar cells connected to said bus, said third subsection having approximately X+Y solar cells connected in series.

13. The system according to claim 12 in which said second subsection of solar cells in series and said third subsection of solar cells in series are connected to said satellite operating bus through blocking diodes.

14. The system according to claim 12 in which said third subsection of solar cells is connected in parallel with said first subsection of solar cells in series and said second subsection of solar cells in series.

15. A method of optimizing the performance of a satellite solar array comprising:

calculating the number of solar cells in series required during transfer orbit operation to provide maximum power output at the operating bus voltage of a satellite;

populating an outer panel subsection with the number of solar cells calculated;

connecting said outer panel subsection of solar cells directly to an operating bus of said satellite to bypass the remaining cells in said satellite solar array during transfer orbit operation;

calculating the number of solar cells In series required to populate a second solar panel subsection connected to said outer solar panel subsection of solar cells that will complement the output of said outer panel subsection of solar cells when said solar panels are deployed and jointly provide at the end of the life of the satellite a power output that matches the operating bus voltage of the satellite;

populating said second solar panel subsection with the number of solar cells calculated;

providing connecting means that automatically connects said outer panel subsection and said second panel subsection in series to said bus when said solar panels are deployed.

* * * * *